United States Patent [19]
Baker et al.

[11] 3,882,089
[45] May 6, 1975

[54] VULCANIZING NATURAL OR SYNTHETIC RUBBER WITH A DIURETHANE DECOMPOSABLE TO DIISOCYANATE

[75] Inventors: Crispin Stuart Leworth Baker, Stapleford; Douglas Barnard, Welwyn; Maurice Read Porter, Aston, all of England

[73] Assignee: The Malaysian Rubber Producers Research Association

[22] Filed: Apr. 5, 1974

[21] Appl. No.: 458,450

Related U.S. Application Data

[63] Continuation-in-part of Ser. No. 172,589, Aug. 17, 1971.

[30] Foreign Application Priority Data

Aug. 18, 1970 United Kingdom.............. 39804/70

[52] U.S. Cl................260/77.5 CR; 260/77.5 TB; 260/79.5 A; 260/79.5 B; 260/79.5 P; 260/83.3; 260/85.1; 260/92.3; 260/94.7 R; 260/390; 260/391; 260/393; 260/396 N; 260/768; 260/775
[51] Int. Cl... C08g 53/00; C08g 22/16; C08g 22/32
[58] Field of Search....................260/391, 393, 260/396 N, 390, 77.5 CR, 77.5 AC

[56] References Cited
UNITED STATES PATENTS

| | | | |
|---|---|---|---|
| 3,352,750 | 11/1967 | Buntin | 260/396 N |
| 3,645,980 | 2/1972 | Baker et al. | 260/77.5 CR |
| 3,775,441 | 11/1973 | Baker et al. | 260/77.5 CR |

OTHER PUBLICATIONS

Migrdichian, Org. Syn. V. 1 (1957), p. 448–449.

*Primary Examiner*—H. S. Cookeram
*Attorney, Agent, or Firm*—Wenderoth, Lind & Ponack

[57] ABSTRACT

The invention provides a method of vulcanizing a natural or unsaturated synthetic rubber by means of a compound having the general formula:

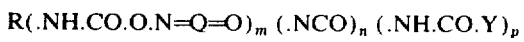

where
$m \geq 1$
$n \geq 0$
$p \geq 0$
$(n + p\frac{1}{4}) \geq 1$
Q is an aromatic group in the quinonoid form,
R is an aromatic or saturated aliphatic group having a functionality of $(m + n + p)$,
Y is an organic group joined to (.NH.CO.) through oxygen or nitrogen.

8 Claims, No Drawings

VULCANIZING NATURAL OR SYNTHETIC RUBBER WITH A DIURETHANE DECOMPOSABLE TO DIISOCYANATE

This application is a continuation-in-part of our U.S. Ser. No. 172,589 filed on Aug. 17, 1971. The said application Ser. No. 172,589 relates to certain urethanes having utility as rubber additives.

The present application relates to methods of vulcanizing rubber using urethanes of the same general kind.

U.S. Pat. No. 3,645,980 Ser. No. 862,507) relates to a method of cross-linking a natural or synthetic rubber, which method comprises reacting the rubber with an aromatic nitroso-compound, e.g. 4-nitrosophenol, and reacting pendent amino or hydroxyl groups in the resulting product with a polyfunctional linking agent, particularly a di- or polyisocyanate, so as to cross-link the rubber.

According to a preferred aspect of the said Patent, the aromatic nitroso-compound and linking compound are added to the rubber in the form of a pre-reaction product of a nitrosophenol with a di- or polyisocyanate. The pre-reaction product is formed by a reaction between the isocyanate and the nitrosophenol in its oxime form, which may be exemplified as:

$$2[O=N-Ar-OH \longleftrightarrow HO-N=Q=O] + OCN-R-NCO \rightarrow O=Q=N-O-CO-NH-R-NH-CO-O-N=Q=O$$

where R is an organic difunctional group, Ar is an aromatic group and Q is the aromatic group in its quinonoid form. This diurethane is believed to subsequently decompose at an elevated temperature to give the nitrosophenol and the di-isocyanate which then vlucanize the rubber.

The use of a pre-reaction product of this type provides equal numbers of nitrosophenol molecules and isocyanate groups in the rubber mix. In fact, it has been found desirable to add an excess of di-isocyanate to increase the cross-linking efficiency of the system. Thus, U.S. Pat. No. 3,645,980 contemplates the use of from 2 to 10 pphr of diurethane and up to 6 pphr of an excess of di-isocyanate.

It is a disadvantage of this prior system that many of the available di-isocyanates are toxic and could not readily be handled in the free state by the rubber industry. In one aspect, the present invention seeks to avoid this disadvantage by the use of urethanes which are capable of decomposing to give more isocyanate groups than nitrosophenol molecules.

Accordingly, this invention provides a method of vulcanizing a natural or synthetic rubber having an unsaturated carbon chain, which method comprises heating at from 100°C to 200°C for 6 hours to 10 seconds a mixture of the rubber with from 1 to 20 pphr of a compound having the general formula:

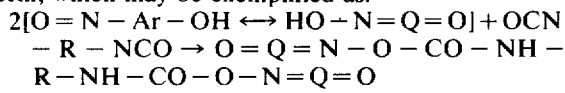

where $m \geq 1$, preferably 1 or 2,
$n \geq 0$, preferably 0, 1 or 2,
$p \geq 0$, preferably 0, 1 or 2,
$(n + p) \geq 1$, preferably 1 or 2,
Q is an aromatic group in the quinonoid form,
R is an aromatic or saturated aliphatic group having a functionality of $(m + n + p)$, and
Y is an organic group joined to (.NH.CO) through oxygen or nitrogen, preferably derived from an aliphatic hydroxyl, aromatic hydroxyl, amine, amide, lactam or aliphatic oxime group.

These urethanes may conveniently be prepared from di- or polyisocyanates having the formula $R(.NCO)_{m+n+p}$.

The nature of the di- or poly-functional group R is not critical to this invention, and it will be noted that the group R is not altered during the preparation or reaction of the compounds of this invention. Any di- or polyisocyanate may be used for this purpose. Examples of di-isocyanates which have been used are:

toluene-2,4-di-isocyanate,
4,4'-di-isocyanato-dicyclohexylmethane,
methylene-bis-(4-phenylene-isocyanate),
2,2,4-trimethyl-hexamethylene-1,6-di-isocyanate,
naphthylene-1,5-diisocyanate, and
3,3,5,5-tetramethylcyclohexyl-1,7-di-isocyanate.

Other di-isocyanates which may conveniently be used include:

toluene-2,6-di-isocyanate,
hexylene-1,6-di-isocyanate,
3,3'-dimethyl-diphenyl-4,4'-di-isocyanate.

An example of a tri-isocyanate is sold by Farbenfabriken Bayer under the Trade Mark Desmodur R, which is 4,4', 4'-triphenylmethane-triisocyanate.

In addition to di-, tri-, and higher poly-isocyanates, there are available mixtures having a non-integral average number of isocyanate groups per molecule, for example polymethylene polyphenyl isocyanate (PAPI) in the form of a mixture having an average functionality of between 2 and 3. Such mixtures are also suitable starting materials for the preparation of these compounds.

The group (.NH.CO.O.N. = Q = O) may be formed by the reaction of an isocyanate group with a nitrosophenol, as explained above and as more fully described in U.S. Pat. No. 3,645,980. The nitrosophenol is one having a nitroso group attached to a carbon atom of an aromatic ring, particularly a benzene or naphthalene ring, and also having at least one hydroxyl group, such that the compound is capable of reaction in its oxime form with isocyanate. The aromatic ring may carry one or more alkyl groups, each containing up to four carbon atoms, provided that such substituents are not so large or so positioned as to prevent the functional group or groups from reacting with the isocyanate. We prefer to use 3-methyl-4-nitrosophenol.

The group (.NH.CO.Y) may be formed by the reaction of an isocyanate group with a compound containing a reactive hydrogen atom provided by, for example, a hydroxyl group or a primary or secondary amino group. Examples of compounds containing a hydroxyl group are alcohols, for example ethyl alcohol; phenols, for example phenol, thymol, alpha-naphthol; and oximes, for example acetoneoxime, acetophenoneoxime, benzaldoxime. Examples of compounds containing a primary or secondary amino group are amines, for example n-propylamine, phenylbetanaphthylamine; and amides, for example acetamide, benzamide, caprolactam. The reaction is of a kind which is well known, and may be represented thus:

R.NCO + HOX → R.NH.CO.O.X
R.NCO + HO.N:CXX' → R.NH.CO.O.N:CXX'
R.NCO + H.NXX' → R.NH.CO.NXX'
R.NCO + HN(X') CO.X → R.NH.CO.N(X') CO.X where R is as defined above and X and X' are organic groups (or hydrogen in the case of X') whose natures are unimportant provided that they do not inhibit the reaction. Alternatively, the starting compound of which X and X' form a part may be di- or poly-functional with respect to isocyanate, for example resorcinol, bisphenol A, decamethylenediamine.

In the above reaction schemes, X may be monovalent, preferably:
a. a saturated aliphatic group of up to 10 carbon atoms, or
b. an aryl-substituted saturated aliphatic group of up to 10 carbon atoms, or
c. a saturated cycloaliphatic group of up to 10 carbon atoms, or
d. a benzene or naphthalene or pyridine ring, either unsubstituted or substituted by aromatic or saturated aliphatic groups totalling up to 10 carbon atoms.

Also in the above reaction schemes X' may be monovalent, preferably hydrogen or one of the groups described by (a) to (d) above. Alternatively, X and X' together with the atom or atoms to which they are attached may form a saturated ring system. X may also be di- or poly-valent, when it is preferably either a saturated aliphatic group of up to 10 carbon atoms, or a benzene ring or group of benzene rings linked, directly or by aliphatic groups and either unsubstituted or substituted by one or more aromatic or saturated aliphatic groups which contain up to a total of 10 carbon atoms. When X is di- or poly-valent, X' is preferably a hydrogen atom. The inert residue of the compound containing a reactive hydrogen atom which reacts with isocyanate to form the group (.NH.CO.Y), is not critical to the present invention.

There follows a discussion of the preparation of examples of various classes of compounds within the broad definition set out above.

A. $m \geqslant 1, n \geqslant 1, p = 0$. This class is exemplified by the isocyanatourethane formed from a di-isocyanate and a nitrosophenol $O = N - C_6H_4 - OH \rightleftharpoons HO - N = C_6H_4 = O +$
$OCN - R - NCO \rightarrow OCN - R - NH.CO.O.N$
$= C_6H_4 = O$ There is always the danger in this reaction of forming unwanted diurethane. For this reason it is preferable to employ at least two moles of di-isocyanate per mole of nitrosophenol, and to carry out the reaction at a temperature below that at which reversible thermal dissociation of the urethane becomes rapid. Thus, we prefer to carry out the reaction at temperatures below 120°C, preferably below 100°C, when using aliphatic di-isocyanates, and below 100°C, preferably below 80°C, when using the more active aromatic di-isocyanates.

Our preferred procedure is to dissolve the isocyanate in an inert organic solvent in which the urethane is insoluble, e.g. toluene, and to add the nitrosophenol to this solution. The nitrosophenol dissolves slowly, and the urethane comes out of solution as it is formed. It will be appreciated that the proportion of isocyanate to nitrosophenol in solution at any given moment is very high, so that there is little danger of diurethane formation. After removal of the urethane by filtration, we have found that the isocyanate solution can readily be recycled for repeated re-use.

B. $m = 1, n = 0, p \geqslant 1$, Y is the phenoxy group of a monohydric phenol.

These are products which may be formed by reacting a di- or poly-isocyanate with a phenol and with a nitrosophenol. The two reactions may be performed in either order, provided that:
a. the first reaction leaves at least one isocyanate group free per molecule, and
b the second reaction is performed under conditions which do not give rise to rapid reversible decomposition of the intermediate reaction product.

The reaction may be exemplified using TDI, phenol and nitrosophenol thus:

$O = C_6H_4 = N-OH + OCN - C_7H_6 - NCO + HO - C_6H_5 \rightarrow O = C_6H_4 = N - O - CO.NH.C_7H_6.NH.CO.O.C_6H_5$ The reaction of phenol with isocyanate may be catalysed, e.g. with triethylenediamine. In the absence of a catalyst, this reaction requires temperatures of the order of 100°C, so that we would then prefer to treat TDI with phenol first, and the resulting product with nitrosophenol.

C. $m = 1, n = 0, p \geqslant 1$, Y is the bis-phenoxy grouping of a dihydric or bis-phenol.

The formula of representative compounds in this class may be given as $X + O - CO - NH - R - NH - CO - N = Q = O)_2$ where Q, R and X are as previously defined. They may be formed from the reaction of a di- or poly-isocyanate with a nitrosophenol and a dihydric phenol or bis-phenol. As with compounds of class B, the two reactions of the isocyanate may be performed in either order.

D. $m = 1, n = 0, p \geqslant 1$, Y is a secondary or tertiary amino group.

Compounds of this class are preferably prepared by reacting an isocyanatourethane of class A in a suitable solvent with an equivalent amount of a primary or secondary amine.

E. $m = 1, n = 0, p \geqslant 1$, Y is the secondary amine grouping of a polymethylenediamine. The formula of representative compounds in this class may be given as $O = Q = N - O - CO - NH - R - HN - CO - NH - (CH_2)_x - NH - CO - NH - R - NH - CO - O - N = Q = O$ where x is 2 to 10 or more.

Compounds in this class may be prepared by reacting an isocyanatourethane with an aliphatic diamine having the desired chain length.

F. $m = 1, n = 0, p \geqslant 1$, Y is the iminoxy group of an aldoxime or ketoxime. Compounds of this class are preferably prepared by first reacting an excess of a di- or polyisocyanate with an oxime and then treating the adduct in a suitable solvent with a nitrosophenol.

G. $m = 1, n = 0, p \geqslant 1$, Y is an amido group. Compounds of this class are preferably prepared by first reacting an excess of a di- or polyisocyanate with an amide and then treating the adduct in a suitable solvent with a nitrosophenol.

The vulcanization and other conditions may conveniently be as described in U.S. Pat. No. 3,645,890. In order to avoid porosity in the vulcanizate and loss of isocyanate, it may be desirable but not essential to add to the rubber mix a drying agent of such a nature and in such an amount as to remove the water by reacting chemically with it. Calcium oxide is an example of such a drying agent, and a suspension of calcium oxide in oil sold under the Trade Mark Caloxol is particularly suitable.

Thorough mixing of the compound with the rubber is necessary, and this may conveniently be achieved by using an open mill or an internal mixer. Generally, an open mill is preferable except when the free isocyanate groups of the compound are blocked as in classes B, C, D, E, F and G above. This cross-linking system may be used either alone, or in conjunction with other systems, e.g. using sulphur, in order to vulcanize the rubber provided that the other vulcanizing ingredients do not interfere with the action of the compounds of this invention. The compounds of this invention may be added to the rubber before, together with, or after such other fillers, additives, or other compounding ingredients as may be determined for the subsequent application of the vulcanizate by the usual practice of the art.

The amount of the compound of this invention to be added to the rubber will depend upon the degree of cure required and can quite readily be determined by methods known in the art. Thus the proportion of the compound may be from 1 to 20, preferably from 5 to 15, parts by weight per hundred parts of dry rubber.

A most important advantage of the system over sulphur systems is that vulcanizates prepared according to it are virtually reversion-resistant. Conditions of cure are therefore not critical, provided always that the temperature of cure is sufficient to form in situ the nitroso compound and the di- or poly-isocyanate. Curing conditions may, for example, range from 100°C. to 200°C., for from 6 hours to 10 seconds, e.g. from 1 hour to 10 minutes.

The cross-linking efficiency of the system may be significantly improved by the addition of certain metal salts of thiols. Examples of such salts include zinc, cadmium and stannous dithiocarbamates, particularly dialkyldithiocarbamates, dithiophosphates, particularly dialkyldithiophosphates, and zinc benzothiazole thiolate. It is to be expected that salts of other thiols and thio-acids, in which the (divalent) metal atom is directly bonded to sulphur, will also be effective. Among the salts, the preferred ones are zinc dimethyl-, diethyl- and di-n-butyl-dithiocarbamates on account of their ready availability.

The amount of the metal thio salt used is not critical, and may suitably be from 0.5 to 10, preferably 1 to 6, parts by weight per hundred parts of dry rubber. Generally, 2 parts of the salt are sufficient to give the desired efficiency increase, and there is little to be gained by going above this figure.

We believe that the heat supplied to vulcanize the rubber causes the compound of this invention to be split into its component parts, which then react with and cross-link the rubber. Thus, isocyanatourethanes (when $p = 0$ as described in class A above) are believed to yield the free nitrosophenol and di- or poly-isocyanate; the nitrosophenol reacts with the rubber molecule forming pendent aminophenol groups, and the cross-links are completed by the poly-functional isocyanate molecules.

When the free isocyanate groups of the compounds of this invention are blocked, e.g. with phenols (i.e., when $n = 0$ and $p \geq 1$ as described in classes B, C, D, E, F and G above), the poly-functional isocyanate is not available to complete the cross-links until the bond with, e.g. the phenol, has been broken. The decomposition generally takes place at a higher temperature than the decomposition of the isocyanate-nitrosophenol bond, and thus reduces the risk of scorch.

Thus, a considerable degree of control over the rate and efficiency of vulcanization obtainable with a particular compound can be obtained by appropriate selection of the nitrosophenol and of the isocyanate, and by blocking free isocyanate groups with an appropriate phenol, alcohol, amine, oxime or amide. For reasons of economy and of rate and efficiency of vulcanization, we prefer to prepare compounds from 3-methyl-4-nitrosphenol and either toluene-2,4-di-isocyanate or methylene-bis-(4-phenylene-isocyanate), and to block free isocyanate groups with phenol or naphthol.

The following Examples illustrate the invention. In the Examples, the following abbreviations are used.

TDI is toluene-2,4-di-isocyanate

MDI is methylene-bis-(4-phenylene-isocyanate)

Hylene W is 4,4'-di-isocyanato-dicyclohexylmethane

Desmodur R is 4,4',4''-triphenylmethane-triisocyanate

Bisphenol A is 2,2-di-(4-hydroxyphenyl)-propane

SMR is Standard Malaysian Rubber

HAF is high abrasion furnace

Dutrex R is the Trade Name of a rubber processing oil

Caloxol C31 is the Trade Name of calcium oxide suspended in oil

ZDMC is zinc dimethyldithiocarbamate

BR is butadiene rubber (e.g. sold under the Trade Names Cis-4 and Intene 55)

SBR is styrene-butadiene rubber (e.g. sold under the Trade Name Intol 1500)

NBR is acrylonitrile-butadiene rubber (e.g. sold under the Trade Name Krynac 803)

CR is chloroprene rubber (e.g. sold under the Trade Name Neoprene WRT)

IR is isoprene rubber (e.g. sold under the Trade Name Natsyn)

Examples 1 and 2 illustrate the preparation of typical isocyanatourethanes carrying unblocked isocyanate groups.

EXAMPLE 1

Preparation of isocyanatourethane from 4-nitrosophenol and TDI

4-Nitrosophenol (49.2 g) was stirred with a solution of TDI (348g) in toluene (1200 ml) at room temperature for 2 hours under nitrogen. During this time the 4-nitrosophenol dissolved and a bright yellow precipitate formed. The precipitate was filtered off and washed with light petroleum (b.p. 40°-60°C.) to give, after pumping free of solvent, the product, 109g (92%), m.p. 138.5° – 145°C. (with decomposition). Infrared absorption bands at 2,280 (NCO), 1,785 (oxime carbamate C=O), and 1,643 cm$^{-1}$ (quinone C=O).

| | | |
|---|---|---|
| Analysis $C_{15}H_{11}N_3O_4$ requires C, 60.6; | H, 3.7; | N, 14.1 |
| found C, 60.9; | H, 3.7; | N, 13.8% |

EXAMPLE 2

Preparation of isocyanatourethane from 4-nitrosophenol and MDI

4-Nitrosophenol (6.15 g.) and MDI (62.5 g.) were stirred in toluene (375 ml) at 70°C. for 30 minutes under nitrogen. A yellow precipitate began to form almost immediately. The precipitate was filtered off and washed with toluene and light petroleum (b.p. 40°-60°C.) to give, after pumping free of solvent, the product, 14.6 g (78%), m.p. 116°-118°C.

| Analysis $C_{21}H_{15}N_3O_4$ requires | C, 67.5; | H, 4.1; | N, 11.2 |
|---|---|---|---|
| found | C, 67.3; | H, 4.2; | N, 10.8% |

Examples 3 to 14 relate to the preparation of other unblocked isocyanatourethanes by methods similar to those used in Examples 1 and 2. Details are given in Table I.

g, 66%). The mother liquor from this filtration was re-used as follows. A further 0.5 mole each of phenol and TDI were added to the mother liquor and the reactants refluxed as before. On cooling to room temperature colourless crystals of the product were formed (113 g, 85%). The mother liquor may be used for further reactions. The colourless crystalline product may be recrystallized from a 1:1 mixture of benzene and light petroleum (b.p. 60°-80°C.) and is believed to be the mono-adduct (of which there are two possible isomers) of phenol and TDI.

This mono-adduct (165 g, 0.62 mole) and 4-nitrosophenol (72 g, 0.59 mole) were stirred in toluene (2 l) for 60 minutes at 65°C. during which time a dense yellow precipitate had formed. This was filtered off and

TABLE I

ISOCYANATOURETHANES

| Example | Nitrosophenol | mole | Diisocyanate | Mole | Solvent | Temp. °C | Time, min. | Yield % | m.p. °C. |
|---|---|---|---|---|---|---|---|---|---|
| 1 | 4-nitrosophenol | 1 | TDI | 5 | Toluene | RT | 120 | 92 | 139-145 |
| 2 | " | 1 | MDI | 5 | " | 70 | 30 | 78 | 116-118 |
| 3 | " | 1 | Hylene W | 5 | " | 60 | 20 | | 85-87 |
| 4 | " | 1 | Desmodur R | 3 | Dichloromethane | RT* | 180 | 94 | 80-82 |
| 5 | 3-methyl-4-nitrosophenol | 1 | TDI | 5 | Toluene | RT | 150 | 90 | 192-194 |
| 6 | 3-methyl-4-nitrosophenol | 1 | MDI | 5 | " | RT | 120 | 95 | 150-152 |
| 7 | 2-methyl-4-nitrosophenol | 1 | TDI | 5 | " | RT | 240 | 71 | 117-119 |
| 8 | 5-methyl-2-isopropyl-4-nitrosophenol | 1 | TDI | 5 | " | RT* | 60 | 94 | 155-157 |
| 9 | 2-methyl-5-isopropyl-4-nitrosophenol | 1 | TDI | 5 | " | RT | 240 | 84 | 129-131 |
| 10 | 3-isopropyl-4-nitrosophenol | 1 | TDI | 5 | " | RT | 40 | 61 | 122-123 |
| 11 | 3,5-dimethyl-4-nitrosophenol | 1 | TDI | 5 | " | RT | 180 | 73 | 171-173 |
| 12 | 2,6-dimethyl-4-nitrosophenol | 1 | TDI | 5 | " | RT | 120 | 43 | 134-136 |
| 13 | 2,6-diisopropyl-4-nitrosophenol | 1 | TDI | 5 | " | RT | 180 | 42 | 103-105 |
| 14 | 1-nitro-2-naphthol | 1 | TDI | 5 | " | RT | 90 | 61 | 151.5 |

*Triethylendiamine catalyst employed.

Example 15 illustrates the preparation of a typical isocyanatourethane in which the free isocyanate groups are blocked by phenol.

EXAMPLE 15

Phenol (47 g., 0.5 mole) and TDI (261 g., 1.5 mole) were stirred together in refluxing light petroleum (b.p. 100°-120°C.) (750 ml) for 5.5 hours. On being allowed to cool, the product crystallized and was filtered off (88 washed with toluene. Yield of "mixed" adduct: 217 g (94%), m.p. 189°C. Infrared absorption bands at 1,760 (oxime carbamate C=O), 1,747 (urethane C=O), 1,650 cm$^{-1}$ (quinone C=O).

Other phenol-blocked isocyanatourethanes were made similarly. Details are given in Table II. In all cases, equimolar proportions of the nitrosophenol and the mono-adduct of phenol and TDI described in Example 15 were reacted together in toluene.

TABLE II

Phenol Blocked Compounds

| Example | Nitrosophenol | Temp. °C. | Time (min.) | Yield % | m.p. °C. |
|---|---|---|---|---|---|
| 15 | 4-nitrosophenol | 65 | 60 | 94 | 189 |
| 16 | 3-methyl-4-nitrosophenol | 65 | 90 | 92 | 195-197 |
| 17 | 2-methyl-4-nitrosophenol | 70 | 120 | 83 | 185 |
| 18 | 3,5-dimethyl-4-nitrosophenol | 65 | 120 | 90 | 137-139 |
| 19 | 2,6-di-isopropyl-4-nitrosophenol | 65 | 150 | 78 | 133-134 |
| 20 | 2-tert-butyl-4-nitrosophenol | 65 | 240 | 76 | 152-155 |

Example 15 was repeated using 3-methyl-4-nitrosophenol in place of 4-nitrosophenol and using various blocking compounds. The results are given in Table III.

TABLE III

| | Blocked Compounds | | | | |
|---|---|---|---|---|---|
| Example | Blocking Compound | Temp. °C. | Time (min.) | Yield % | m.p. °C. |
| 21 | phenol | 65 | 90 | 92 | 195–197 |
| 22 | thymol | 70–80 | 360 | 55 | 156 |
| 23 | 2-naphthol | 60–70 | 120 | 90 | 178 |
| 24 | ethanol | 70–80 | 20 | 78 | 156 |

EXAMPLE 25 n-Propylamine (1.77 g., 0.03 mole) in dichloromethane (100 ml.) was added dropwise over 0.5 hour at room temperature to the isocyanatourethane of Example 1 (8.91 g., 0.03 mole) in dichloromethane (100 ml.). The red precipitate formed was filtered off, washed with dichloromethane and pumped free of solvent to give 8.1 g. (76%) of product, m.p. 150°–160°C.

Examples 26 to 28 relate to the preparation of blocked isocyanatourethanes using difunctional blocking agents.

EXAMPLE 26

Bis-phenol A (1.14 g, 0.005 mole) and TDI (17.4 g, 0.1 mole) were warmed with stirring to 40°c. for 2 hours in toluene (20 ml) and in the presence of triethylenediamine (0.02 g, 4 mole % with respect to bis-phenol A) as catalyst. On cooling, the product was precipitated by addition of light petroleum (b.p. 60°–80°C.). The white coarse powder obtained, believed to be mainly the bis TDI adduct of bis-phenol A, was purified by prolonged extraction with light petroleum (b.p. 60°–80°C.). The product (0.576 g) was stirred with chloroform (25 ml) and the insoluble material filtered off. To the filtrate was added 4-nitrosophenol (0.18 g, 0.00146 mole) and the mixture refluxed for 1 hour with stirring. The resulting yellow chloroform solution was decanted into light petroleum (b.p. 40°–60°C.) to precipitate a yellow solid which, after filtering, was pumped free of solvent. The product, 0.4 g. (67%), m.p. 108°–115°C. is believed to possess the structure $(CH_3)_2C(-C_6H_4-O-CO-NH-C_7H_6-NH-CO-O-N=C_6H_4=O)_2$ and showed infrared absorption bands at 1,745 (oxime carbamate C=O), 1,730 (urethane C=O), and 1,650 cm$^{-1}$ (quinone C=O).

| Analysis $C_{45}H_{38}N_6O_{10}$ requires | C, 65.7; | H, 4.7; | N, 10.2 |
|---|---|---|---|
| found | C, 65.6; | H, 5.0; | N, 9.9% |

EXAMPLE 27

The isocyanatourethane of Example 1 (2.97 g, 0.01 mole) and bis-phenol A (1.14 g, 0.005 mole) were warmed with stirring to 40°C. for 1 hour in chloroform (25 ml) and in the presence of triethylenediamine (0.03 g, 5 mole % with respect to bis-phenol A) as catalyst. During the reaction the reagents slowly dissolved. On cooling to room temperature, the solution was poured into light petroleum (b.p. 40°–60°C.) (300 ml) with stirring. A yellow solid was precipitated which, after filtration, was pumped free of solvent to yield 4.08 g (99.4%) of the product obtained in Example 26, m.p. 108°–115°C.

EXAMPLE 28

Decamethylenediamine (2.58 g, 0.015 mole) in dichloromethane (100 ml) was added slowly over a period of 20 minutes to a stirred suspension of the isocyanatourethane of Example 1 (8.91 g, 0.03 mole) in dichloromethane (200 ml). After addition the reaction mixture was warmed to 40°C for 15 minutes. On cooling the product was filtered off and, after washing 3 times with dichloromethane, was pumped free of solvent. Yield, 9.6 g (84%).

EXAMPLE 29

Acetoneoxime (7.3 g, 0.1 mole) in dry toluene (40 ml) was added dropwise to a well-stirred solution of TDI (34.8 g, 0.2 mole) in toluene (100 ml). The temperature of the mixture rose about 10° during the course of the addition and on cooling to room temperature a colourless crystalline solid, m.p. 110°–112°C, was obtained in 49% yield.

| Analysis: $C_{12}H_{13}N_3O_3$ requires | C, 58.3; | H, 5.3; | N, 17.0 |
|---|---|---|---|
| found | C, 58.5; | H, 5.3; | N, 17.5% |

Isocyanate-group analysis, using di-n-butylamine in dimethyl sulphoxide, showed the solid to contain 99% of the theoretical number of isocyanate groups for a 1:1 adduct of TDI and acetoneoxime. Other adducts were prepared similarly and are described in Table IV.

The acetoneoxime adduct (7.4 g, 0.03 mole) and 4-nitroso-3-methylphenol (4.1 g, 0.03 mole) were heated at 70°C in dry toluene (60 ml) under nitrogen for 30 minutes. The voluminous yellow precipitate formed was washed with petrol and then acetone and dried under vacuum. Yield 88%. Total nitrosophenol analysis, 100%.

Other oxime-blocked isocyanatourethanes were made similarly. Details are given in Table IV.

EXAMPLE 30

Acetamide (11.8 g, 0.2 mole) and TDI (69.6 g, 0.4 mole) were heated under reflux in dry toluene (300 ml) for 18 hours with continuous stirring. The solid obtained in 55% yield on cooling contained 80% of the theoretical number of isocyanate groups for a 1:1 adduct by titration with di-n1butylamine in dimethyl sulphoxide. Work-up of the mother liquors provided a further 41% yield. Recrystallization from a toluene-petroleum mixture gave the adduct, m.p. 148°–9°C, isocyanate groups, 100% of theoretical.

Analysis: $C_{11}H_{11}N_3O_3$ requires C, 56.65; H, 4.75; N, 18.0
found C, 57.8; H, 4.8; N, 17.9%

Other adducts were prepared similarly and are described in Table IV.

The acetamide adduct (5 g, 0.02 mole) and 4-nitroso-3-methylphenol (2.9 g, 0.2 mole) were heated in dry toluene (100 ml) with stirring for 1.5 hours at 70°C. The copious yellow precipitate obtained on cooling was washed successively with pentane and acetone and dried under vacuum. Yield 91%. Total nitrosophenol analysis, 97%.

Other amide-blocked isocyanatourethanes were made similarly. Details are given in Table IV.

The urethanes of Examples 1 to 30 were used as vul-

EXAMPLE 32

The above standard rubber formulation was vulcanized using generally equivalent concentrations of various different unblocked and blocked isocyanatourethanes. The Relaxed Moduli MR 100 of the vulcanizates are given in Table V below, and provide an indication of the degree of cross-linking achieved. The vulcanization conditions are not critical, since the vulcanizates are virtually reversion-free. These experiments were intended to demonstrate that vulcanization took place without attempting to optimise the conditions. Vulcanization conditions were 60 min. at 150°C, except for Example 1 (20 min. at 140°C) and Example 15 (60 min. at 140°C).

Table IV

| Blocking Agent | Oxime- or Amide - TDI Monoadduct | | | | | | | | Oxime or Amide-blocked isocyanatourethane from TDI and 4-nitroso-3-methylphenol | | |
|---|---|---|---|---|---|---|---|---|---|---|---|
| | Yield (%) | M.p. (°C) | Found % | | | Required (%) | | | NCO Groups (% of theory) | Yield (%) | Combined nitrosophenol (% of theory) |
| | | | C | H | N | C | H | N | | | |
| Acetoneoxime | 49 | 110–2 | 58.5 | 5.3 | 17.5 | 58.3 | 5.3 | 17.0 | 99 | 88 | 100 |
| Acetophenoneoxime | 70 | oil | 65.6 | 4.7 | 13.8 | 66.0 | 4.9 | 13.6 | 99 | 99 | 97 |
| Cyclohexanoneoxime | 73 | 95–8 | 62.8 | 6.1 | 15.2 | 62.7 | 6.0 | 14.6 | 104 | 99 | 100 |
| Propionaldoxime | 60 | oil | 59.3 | 5.5 | 17.4 | 58.3 | 4.9 | 17.1 | 95 | 95 | 99 |
| Benzaldoxime | 80 | 108–112 | 65.6 | 4.5 | 14.5 | 65.1 | 4.4 | 14.2 | 102 | 99 | 93 |
| Acetamide | 96 | 148–9 | 57.8 | 4.8 | 17.9 | 56.6 | 4.8 | 18.0 | 100 | 91 | 97 |
| Propionamide | 100 | 146–7 | 58.6 | 5.3 | 17.3 | 58.3 | 5.3 | 17.0 | 100 | 96 | 96 |
| Lauramide | 100 | 66–73 | 67.0 | 8.6 | 11.5 | 67.5 | 8.4 | 11.3 | 102 | 92 | 85 |
| Stearamide | 70 | 68–74 | 68.9 | 9.2 | 9.8 | 70.8 | 9.5 | 9.2 | 102 | 77 | 93 |
| Acrylamide | 86 | 176–7 | 59.7 | 4.5 | 17.5 | 58.7 | 4.5 | 17.1 | 99 | 94 | 91 |
| Nicotinamide | 93 | 220–240 | | | | | | | 90 | 98 | 80 |
| Benzamide | 90 | — | 65.1 | 4.1 | 14.3 | 65.1 | 4.4 | 14.2 | 98 | 80 | 95 |
| Caprolactam | — | oil | 62.3 | 5.8 | 14.7 | 62.5 | 5.9 | 14.6 | 98 | 95 | 101 | canizing agents in various gum and filled natural and synthetic rubber formulations. For Examples 31 and 32, the following standard black-filled natural rubber formulation was used:

| | |
|---|---|
| Natural rubber (SMR 5) | 100 |
| HAF black | 50 |
| Dutrex R | 4 |
| Caloxol C31 | 5 |
| ZDMC | 2 |
| Vulcanizing agent | varies |

EXAMPLE 31

The above standard standard formulation was used with 8 pphr of the isocyanatourethane of Example 1, and was cured at 140°C for 20 minutes. The initial properties of the vulcanizate were as follows:

| | |
|---|---|
| Hardness, °BS | 68 |
| Relaxed Modulus, MR 100, MN/m² | 2.54 |
| Tensile Strength, MN/m² | 26.2 |
| Elongation at break, % | 415 |
| Tear Strength (max.), N/mm | 17.6 |
| Dunlop Resilience, % | 73.1 |

TABLE V

| Isocyanatourethane of Example | Concentration pphr | MR 100 (MN/m²) of Vulcanizate |
|---|---|---|
| 1 | 8 | 2.54 |
| 5 | 9 | 2.39 |
| 7 | 9 | 2.49 |
| 10 | 9.8 | 1.41 |
| 11 | 9.4 | 1.21 |
| 12 | 9.4 | 2.20 |
| 13 | 11.0 | 1.71 |
| 15 | 10.5 | 3.12 |
| 16 | 11.7 | 2.33 |
| 17 | 11.7 | 2.54 |
| 19 | 13.7 | 1.34 |
| 20 | 12.9 | 1.92 |
| 21 | 11.7 | 2.33 |
| 22 | 13.3 | 1.83 |
| 23 | 13.1 | 1.60 |
| 24 | 10.3 | 1.21 |

EXAMPLE 33

The isocyanatourethanes of Examples 1 and 2 were used to prepare natural rubber gum vulcanizates, whose tensile properties are reported in Tables VI and VII below.

and ZDMC (2 pphr). Results are set out in Table IX below.

Table VI

| NR gum vulcanizates cured with product of Example 1 | | | | | | | | |
|---|---|---|---|---|---|---|---|---|
| Compound Ingredients | | | | | | | | |
| SMR 5 | 100 | 100 | 100 | 100 | 100 | 100 | 100 | 100 |
| Caloxol C31 | 5 | 5 | 5 | 5 | 5 | 5 | 5 | 5 |
| ZDMC | 2 | 2 | 2 | 2 | 2 | 2 | 2 | 2 |
| Product of Example 1 | 3 | 4 | 5 | 6 | 7 | 8 | 9 | 10 |
| Cure, min. at 140°C. | 20 | 20 | 20 | 20 | 20 | 20 | 20 | 20 |
| Initial vulcanizate properties | | | | | | | | |
| Relaxed modulus, MR 100, $MN/m^2$ | 0.50 | 0.61 | 0.71 | 0.81 | 0.90 | 1.04 | 1.12 | 1.23 |
| Tensile Strength, $MN/m^2$ | 20.8 | 20.5 | 18.4 | 23.6 | 21.7 | 26.5 | 28.3 | 21.6 |
| Elongation at break, % | 792 | 689 | 589 | 654 | 532 | 570 | 563 | 494 |

Table VII

| NR gum vulcanizates cured with product of Example 2 | | | | | | | | |
|---|---|---|---|---|---|---|---|---|
| Compounding Ingredients | | | | | | | | |
| SMR 5 | 100 | 100 | 100 | 100 | 100 | 100 | 100 | 100 |
| Caloxol C31 | 5 | 5 | 5 | 5 | 5 | 5 | 5 | 5 |
| ZDMC | 2 | 2 | 2 | 2 | 2 | 2 | 2 | 2 |
| Product of Example 2 | 2 | 3 | 4 | 5 | 6 | 7 | 8 | 9 |
| Cure, min. at 150°C. | 40 | 40 | 40 | 40 | 40 | 40 | 40 | 40 |
| Initial vulcanizate properties | | | | | | | | |
| Relaxed modulus, MR 100, $MN/m^2$ | 0.35 | 0.45 | 0.56 | 0.64 | 0.76 | 0.85 | 0.96 | 1.01 |
| Tensile Strength, $MN/m^2$ | 9.3 | 14.4 | 19.6 | 20.1 | 16.0 | 20.1 | 22.8 | 17.9 |
| Elongation at break, % | 784 | 813 | 778 | 721 | 629 | 634 | 620 | 548 |

EXAMPLE 34

This Example demonstrates the ability of the compounds of this invention to vulcanize synthetic rubbers having unsaturated carbon-chains. Formulations are given in Table VIII below. In all cases, the vulcanizing agent was the unblocked isocyanatourethane from 3-methyl-4-nitrosophenol and TDI. Mooney Scorch (at 10 pphr of vulcanizing agent) and Relaxed Modulus (at varying proportions of vulcanizing agent) are also given in the Table. In considering the scorch times, it should be borne in mind that curing with these isocyanatourethanes takes place progressively over a period of time, in contrast to the sudden delayed action curing which is typical of sulphur systems. The vulcanization conditions were 2 hours at 150°C., except for CR (6 hours at 150°C.).

Table IX

| Product of Example | Concentration (pphr) | Mooney Scorch at 120°C. | |
|---|---|---|---|
| | | (t + 5) min. | (t + 35) min. |
| 14 | 6 | 4.5 | 6.0 |
| 24 | 5.4 | 4.5 | 7.5 |
| 25 | 10.5 | 4.0 | 8.0 |
| 27 | 11.5 | 4.5 | 8.5 |

EXAMPLE 36

This Example illustrates the ability of blocked isocyanatourethanes of this invention to vulcanize natural rubber containing a reinforcing carbon black by reference to Mooney Scorch time and to change in torque

TABLE VIII

| SYNTHETIC RUBBERS | | | | | | | | | |
|---|---|---|---|---|---|---|---|---|---|
| | | Rubber | HAF black | Dutrex R | Caloxol C31 | ZDMC | Isocyanato-urethane pphr | MOONEY SCORCH (t+5) 120°C. min. | Ioscyanato-urethane pphr | MODULUS MR 100, $MN/m^2$ |
| BR | Cis-4 | 100 | 50 | 4 | 5 | 2 | 10 | 5 | 6 | 1.99 |
| | Intene 55 | 100 | 50 | 4 | 5 | 2 | 10 | 7 | 6 | 1.77 |
| SBR | Intol 1500 | 100 | 50 | 4 | 5 | 2 | 10 | 12.5 | 10 | 1.61 |
| NBR | Krynac 803 | 100 | 50 | 4 | 5 | 2 | 10 | 11.5 | 15 | 1.38 |
| CR | Neoprene WRT | 100 | 50 | 4 | None | 2 | 10 | Immediate | 9 | 4.87 |
| IR | Natsyn | 100 | 50 | 4 | 5 | 2 | 10 | 15 | 10 | 1.37 |

EXAMPLE 35

This Example demonstrates the vulcanizing ability of the compounds of certain Examples by reference to the Mooney Scorch times in a standard unfilled natural rubber formulation containing Caloxol C31 (5 pphr) when mixes were heated in the Monsanto Rheometer (ASTM D2084-71). The formulation used was that in Examples 31 and 32, the vulcanizing agent being the isocyanatourethane derived from 3-methyl-4-nitrosophenol and TDI blocked by various blocking agents. The quantity of vulcanizing agent used was in each case the molar equivalent of 12 pphr of the same isocyanatourethane blocked with phenol.

TABLE X

| Blocking Agent | Mooney Scorch at 120°C (t + 5) min | Monsanto Rheometer at 150°C ($M_{HF}$-$M_L$) | ($M_H$-$M_L$) lbf.in. | ($M_{HH}$-$M_L$)* |
|---|---|---|---|---|
| Phenol | 22 | 115 | | |
| Acetamide | 16 | | 86 | |
| Propionamide | 14 | | 86 | |
| Lauramide | 10 | 44 | | |
| Stearamide | 10 | 44 | | |
| Acrylamide | 18 | | 114 | |
| Nicotinamide | 15 | 86 | | |
| Benzamide | 22 | 155 | | |
| Caprolactam | 12 | 99 | | |
| Acetoneoxime | 4 | | | 110 |
| Acetophenoncoxime | 8 | | | 108 |
| Cyclohexanoneoxime | < 8 | | | 70 |
| Propionaldoxime | < 8 | | | 56 |
| Benzaldoxime | < 8 | | | 75 |
| Quinol | 15 | 124 | | |
| Resorcinol | 8 | 83 | | |
| Bisphenol A | 12 | | | 84 |
| Styrenated phenol | 12 | 92 | | |

*$M_{HF}$, $M_H$, $M_{HH}$ and $M_L$ being as defined in ASTM D 2084-71 T.

EXAMPLE 37

Isocyanatourethanes and phenol-blocked isocyanatourethanes were prepared from 3-methyl-4-nitrosophenol and various diisocyanates and compounded and vulcanized in the formulation of Examples 31 and 32. The properties recorded for the mixes and vulcanizates are shown in Table XI.

TABLE XI

| Key: | |
|---|---|
| ICTM | isocyanatourethane from Hylene TM (Du Pont), believed to an 80:20 wt. per cent mixture of toluene-2,4- and toluene-2,6- di-isocyanate. |
| IC15 | isocyanatourethane from Desmodur 15 (Bayer), believed to be naphthalene-1,5-di-isocyanate. |
| PB.ICTM | phenol-blocked ICTM |
| PB.ICEN | phenol-blocked isocyanatourethane from Suprasec EN (ICI), believed to be an 80:20 wt. per cent mixture of toluene-2,4- and toluene-2,6-di-isocyanate. |

| Vulcanizing Agent | ICTM | IC15 | PB.ICTM | PB.ICEN |
|---|---|---|---|---|
| Concentration (pphr) | 9 | 10 | 11.7 | 11.7 |
| Mooney Scorch at 120°C, (t+5)min. | 9.5 | 6 | 19 | 21 |
| Cure Time at 150°C, min. | 60 | 120 | 50 | 50 |
| Initial Vulcanizate Properties | | | | |
| Relaxed modulus, MR100, MN/m² | 1.68 | 2.33 | 1.59 | 1.54 |
| Tensile strength, MN/m² | 22.5 | 25.9 | 23.5 | 22.5 |
| Elongation at break, % | 430 | 434 | 469 | 449 |

We claim:

1. A method of vulcanizing a natural or synthetic rubber having an unsaturated carbon chain which method comprises heating at from 100°C to 200°C for from 6 hours to 10 seconds a mixture of the rubber with from 1 to 20 pphr of a compound having the general formula (I)

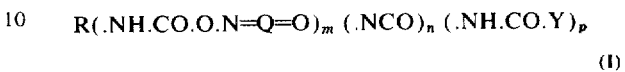

$$R(.NH.CO.O.N=Q=O)_m (.NCO)_n (.NH.CO.Y)_p \quad (I)$$

where
   $m \geqslant 1$
   $n \geqslant 0$
   $p \geqslant 0$
   $(n + p) \geqslant 1$
   Q is an aromatic group in the quinonoid form,
   R is an aromatic or saturated aliphatic group having a functionally of $(m + n + p)$, and
   Y is an organic group joined to (.NH.CO.) through oxygen or nitrogen.

2. A method as claimed in claim 1, wherein in the compound of formula (I)
   $m$ is 1 or 2
   $n$ is 0, 1 or 2
   $p$ is 0, 1 or 2 and
   $(n + p)$ is 1 or 2.

3. A method as claimed in claim 1, wherein in the compound of formula (I), Q is a benzene ring in its paraquinonoid form or a naphthalene ring system in a quinonoid form.

4. A method as claimed in claim 3, wherein in the compound of formula (I) the group Q carries one or more alkyl groups each containing up to four carbon atoms attached to the aromatic ring.

5. A method as claimed in claim 1, wherein in the compound of formula (I)
   $m$ is 1
   $n$ is 0 or 1
   $p$ is 0 or 1
   $(n + p)$ is 1
   Q is a benzene ring in its para-quinonoid form with or without a methyl group attached in a position ortho to the adjacent nitrogen atom,
   R is toluene-2,4- or methylene-bis-(4-phenylene-), and
   Y is —$OC_6H_5$ or —$OC_{10}H_7$ 6. A method as claimed in claim 1, wherein a drying agent is included in the rubber mix to remove water by reacting chemically with it.

7. A method as claimed in claim 1, wherein a zinc, cadmium or stannous dithiocarbamate or dithiophosphate, or zinc benzothiazole thiolate, is included in the rubber mix.

8. Rubber vulcanized by the method in claim 1.

* * * * *